(12) United States Patent
Dai et al.

(10) Patent No.: US 11,852,721 B1
(45) Date of Patent: Dec. 26, 2023

(54) METHOD FOR LOCATING AND FINDING ITEMS BASED ON ACOUSTIC SIGNAL

(71) Applicant: ZHEJIANG DEQING ZHILU NAVIGATION TECHNOLOGY CO., LTD, Huzhou (CN)

(72) Inventors: Jian Dai, Shenzhen (CN); Shoubin Chen, Shenzhen (CN); Keqiang Liu, Huzhou (CN)

(73) Assignee: Shenzhen Zenith Technology Co., LTD, Shenzhen (CN)

( * ) Notice: Subject to any disclaimer, the term of this patent is extended or adjusted under 35 U.S.C. 154(b) by 0 days.

(21) Appl. No.: 18/305,335

(22) Filed: Apr. 22, 2023

Related U.S. Application Data

(63) Continuation of application No. PCT/CN2022/105044, filed on Jul. 12, 2022.

(30) Foreign Application Priority Data

Jul. 7, 2022 (CN) .......................... 202210794893.6

(51) Int. Cl.
  *G01S 15/42* (2006.01)
  *G01S 5/18* (2006.01)
  *G01S 7/52* (2006.01)
(52) U.S. Cl.
  CPC ................ *G01S 15/42* (2013.01); *G01S 5/18* (2013.01); *G01S 7/52026* (2013.01)

(58) Field of Classification Search
  CPC ......... G01S 15/42; G01S 5/18; G01S 7/52026
  See application file for complete search history.

(56) References Cited

U.S. PATENT DOCUMENTS

| | | | | |
|---|---|---|---|---|
| 5,150,336 A | * | 9/1992 | Sullivan | G10K 11/341 367/103 |
| 10,520,601 B2 | * | 12/2019 | Cohen | G01S 15/931 |
| 2017/0219701 A1 | * | 8/2017 | Doherty | G01S 15/42 |

FOREIGN PATENT DOCUMENTS

| | | |
|---|---|---|
| CN | 104297728 A | 1/2015 |
| CN | 107192984 A | 9/2017 |
| CN | 113993057 A | 1/2022 |

* cited by examiner

*Primary Examiner* — Daniel L Murphy
*Assistant Examiner* — Amie M Ndure
(74) *Attorney, Agent, or Firm* — Nitin Kaushik

(57) ABSTRACT

The present invention discloses an item locating and finding method, system and device based on acoustic signal, which relates to the field of item location, and aims at solving the problems in the prior art that a specific directional angle of the item cannot be detected and the technical solutions in the prior art are not suitable for common intelligent terminals and are greatly affected by the environmental noise; performing unilateral and bidirectional ranging based on the acoustic signal; and performing location by using acoustic ranging and PDR.

1 Claim, 20 Drawing Sheets

METHOD FOR LOCATING AND FINDING ITEMS BASED ON ACOUSTIC SIGNAL

CROSS-REFERENCE TO RELATED APPLICATIONS

The application claims priority to Chinese patent application No. 2022107948936, filed on Jul. 7, 2022, the entire contents of which are incorporated herein by reference.

TECHNICAL FIELD

The present invention relates to the field of object location, and particularly to a method system and device for locating and finding items based on an acoustic signal.

BACKGROUND

According to a global online survey of DIME, a Japanese lifestyle magazine, people spend 75,322 minutes (about 52 days) finding lost things in whole lives. At the same time, after losing something, at least 52.2% people may take a hit, 31.9% people may feel panic, and 17.8% people may seek spiritual help from their spouses and relatives. It is often acknowledged that mental frustration caused by the loss of things may cause physical diseases. This may seem sensational, but in fact the loss of things does bring a lot of trouble to people. Forgetting things may at least reduce the working efficiency and lead to a waste of time.

With the rapid development of science and Internet of things technology, there are some solutions for solving the above object searching problems. This is due to the high convenience, low cost and low energy consumption of the Internet of Things. However, it is difficult for existing technologies to achieve both high availability (wide area and single intelligent terminal support) and precise location awareness.

At present there are two typical technologies; one technology is to use Bluetooth Low Energy to look for the things according to whether a signal is received or according to the received signal strength. However, the BLE can only perform the existence detection, but cannot perform ranging (RSS ranging is not accurate, and the ranging accuracy depends on model parameters) and angle measurement; For example, TilePro can connect with a smartphone through Bluetooth, and then through the sound and vibration of the tag, and users can locate by hearing. This method cannot provide the precise location of the tag, and the way that ranging and positioning depends on human hearing and judgment is unreliable; The other technology is the adoption of Ultra-Wide Bandwidth (UWB), which relies on multiple antenna arrays for ranging and orientation, which makes smart phones require a specific chip or module design, resulting in the vast majority of smart phones not supporting these technologies and limited range (Less than 10 m) is also a major drawback, which brings great limitations to technical scenarios, such as Apple's Air tag, equipped with U1 chip implanted with UWB antenna array, only iPhone 11 and above can detect and point nearby connected Air tags.

Chinese patent with Patent No. CN201911167557.3 discloses an acoustic item finding apparatus and control method, and a voice control setting method and system, which adopts a technical solution that includes a microphone, an acoustic signal preprocessing module, an intelligent voice identification module, a microprocessor and a loudspeaker which are connected successively; the microphone can sense and collect a sound signal to obtain an acoustic signal; the acoustic preprocessing module receives the acoustic signal through a connection interface and preprocesses the acoustic signal to extract corresponding acoustic characteristics of the acoustic signal; the intelligent voice identification module acquires voice vocal prints from the acoustic characteristics and compares the acquired vocal prints with preset vocal prints; when the vocal prints are matched, whether the acoustic characteristics contain a key word or not can be identified, and an identification result is sent to the microprocessor; the microprocessor controls the loudspeaker to issue a prompt tone; as long as the acoustic object searching apparatus is arranged on a target object, the acoustic object searching apparatus is controlled by a user through sound to issue the prompt tone so as to locate the target object; according to the present technical solution, the acoustic object searching apparatus is controlled by the acoustic signal to issue the prompt tone; if the prompt tone issued by the acoustic object searching apparatus is relatively weak, and the user is difficult to hear the prompt tone, the object is located by a wireless signal, which is an object searching method mainly based on sounding and supplemented by the location of the wireless signal, so that the method is greatly affected by the environmental noise; when the environment is open, and the noise is loud, the practicability of the sounding location may be reduced greatly; the ranging accuracy of the wireless signal intensity is at a meter scale, so that the error value is large; and a wireless location device is also required to send the location information to a third-party device such as a mobile phone, a tablet computer, etc, so the operation is complicated.

SUMMARY

A problem to be solved by the present invention is to provide an item locating and finding method, system and device based on acoustic signal, which is low in cost, high in location accuracy, large in effective working range and applicable to mass mobile phones.

In view of the problems in the prior art, the present invention discloses an item locating and finding method based on acoustic signal, which adopts a technical solution that includes the following steps:

Step 1, Designing an Acoustic Signal:

wherein the specific acoustic signal is expressed as:

$$s(t) = A(t)e^{j2\pi\left(f_0 t + \frac{f_e - f_0}{2T}t^2\right)}, t \in [0, T]$$

Wherein $A(t)$ is an amplitude of acoustic wave, T is a period of Chirp signal, and $f_0$ and $f_e$ are an initial frequency and a cut-off frequency respectively.

Considering the indoor fading channel, the received signal can be expressed as:

$$x(t) = s(t) * h(t) = \sum_{i=0}^{L-1} \alpha_i s(t - \tau_i) + N_i(t)$$

Wherein, $h(t)$ is the continuous expression of impulse response (CIR) of the indoor acoustic channel impulse response (CIR); $\alpha_i$, $\tau_i$ and $N_i(t)$ are the channel fading coefficient, propagation delay, and random noise of the i-th propagation path. Generally, $\tau_0$ should be the time of arrival (To A) of the first line-of-sight (LOS) component.

Step 2, unilateral two-way ranging (TWR) based on an acoustic signal

The intelligent terminal broadcasts Chirp signal and records the current system time $t_1$; When the item locating and finding device receives Chirp signal, a fixed delay $t_{reply}$ sends back a Chirp signal. The intelligent terminal receives Chirp signal and records the current system time $t_2$.

The flight time t of the signal between the intelligent terminal and the item locating and finding device is:

$$t=[(t_2-t_1)-t_{reply}]/2$$

After the flight time (t) is obtained, the distance (L) between the intelligent terminal and the locating equipment can be easily calculated:

$$L=v_{sound} \cdot t$$

Wherein $v_{sound}$ is a sound velocity, about 343 m/s.

Step 3, the accurate locating based on acoustic ranging and pedestrian dead reckoning (PDR), the accurate locating includes the following steps:

Step a, Data Preprocessing

Preprocessing is performed on a timestamp based data series.

Firstly in the dynamic mode to complete one TWR required time, the position of the intelligent terminal changes, the two time stamps recorded on the intelligent terminal are not in the same position, at this time, the use of interpolation to the middle of the two positions, so that the error can be reduced to an acceptable range;

Secondly, a hypothesis test with significance level ($\alpha$) of 0.05 was conducted to determine whether the ranging results were reliable.

Step b, Improved Particle Filter by Local Least Square Method

A time series based window is used to obtain qualified local data of a constrained nonlinear least square method to estimate the reference position ($\hat{X}_{tag}$, $\hat{Y}_{tag}$) of the item locating and finding device, ($\hat{X}_{tag}$, $\hat{Y}_{tag}$) is used as the center of Gaussian distribution of initialized or added random n particles $$\{\hat{x}_i\}_{i=N}^{N+n}$$

for the filter;

The filter starts to work after generating particles. Since the item locating and finding device is considered stationary, the position of the intelligent terminal changes in real time. The state model of the particle filter is expressed as:

$$\hat{x}_i^t = \hat{x}_i^{t-1}$$

Since the ranging information L is the only observed value, the single observation model is expressed as:

$$\tilde{w}_i = (2\pi\sigma_L^2)^{-\frac{1}{2}} \exp\left\{-\frac{[L^t - h^t]^2}{2\sigma_L^2}\right\}$$

Wherein, h can be calculated as the distance between the i-th particle and the position of the intelligent terminal;

Finally, when the total number of particles exceeds the threshold $N_{threshold}$, particles with lower weights will be rejected. State estimates can be obtained from an approximate posterior probability distribution, as:

$$\hat{X}_{tag}^t = \sum_{i=1}^{N_{threshold}} \hat{x}_i^t \tilde{w}_i^{t'}$$

Wherein, $$\tilde{w}_i^{t'}$$

is standardization of $\tilde{w}_i^t$;

Step c, K-Means Method to Identify Mirror Points

When the short time trajectory approximates a straight line, both the estimated position and the mirror point obtained by the least square method may be the global optimal solution. Therefore, another mirror particle filtering algorithm is constructed for estimating the position. Two local optimal solutions $(X_1, Y_1)$, $(X_2, Y_2)$ (One of both is a mirror point) are solved by local least squares method. In the initialization phase, Nparticles $$\{\hat{x}_i^0\}_{i=1}^{N}$$

and Nparticles $$\{\hat{x}_i^0\}_{i=N+1}^{2N}$$

are generated from the Gaussian distribution and which takes $(X_1, Y_1)$ or $(X_2, Y_2)$ as the center respectively, and each particle weight is set to ½N. This filter has the same state and observation updates as described in step b. After each particle update, the K-means algorithm with cluster number set to 2, assigns all particles to their nearest cluster.

If the total weight of particles in Cluster1 $w_{total\_C1}$ particles is much less than that of particles in Cluster2 $w_{total\_C2}$.

$$w_{total_{C_1}} < \frac{1}{2} w_{total_{C_2}}$$

Cluster 1 is considered to be a mirror point, and its particles are eliminated. Add the remaining particles from step b to the total particle filter.

The present invention further discloses an item locating and finding system based on an acoustic signal. The item locating and finding system includes an intelligent device and an item locating and finding device arranged on a to-be-found item.

The intelligent terminal includes an inertial sensor, a first loudspeaker and a first microphone; the inertial sensor is used for determining a movement track of the intelligent terminal; and the first loudspeaker and the first microphone are used for transmitting an acoustic signal and receiving the acoustic signal returned by the item locating and finding device.

The item locating and finding device includes a Bluetooth Low Energy unit, a second microphone, a processor and a second loudspeaker. The BLE unit is used for communicating with the item locating and finding device so as to detect the item locating and finding device is within the coverage of a terminal signal; the second microphone is used for receiving the acoustic signal transmitted by the intelligent terminal; the processor is used for processing the received acoustic signal, electric quantity detection, power supply control, etc.; and the second loudspeaker is used for transmitting the processed acoustic signal.

The present invention further discloses an item locating and finding device based on an acoustic signal, which adopts a technical method that the item locating and finding device includes a power supply management module, a BLE unit, a processor, a second microphone, a power amplifier and a second loudspeaker.

The power supply management module is used for supplying power to a circuit;

The BLE unit is used for communicating with the intelligent terminal so as to detect item locating and finding device is within the coverage of a terminal signal;

The processor is used for processing the received acoustic signal, electric quantity detection, power supply control, etc.;

The microphone is used for receiving the acoustic signal transmitted by the intelligent terminal;

The power amplifier is used for amplifying the processed signal; and

The loudspeaker is used for transmitting the amplified acoustic signal.

The present invention has the beneficial effects: the present invention performs the unilateral and bidirectional ranging based on the acoustic signal by designing the specific acoustic signal, and finally uses a ranging result and PDR to perform accurate location; the item locating and finding method, system and device are low in cost, high in location accuracy, large in effective working range and suitable for mass mobile phones, and can be used for the intelligent terminals such as smart phones with Android or iOS operating systems without changing any hardware.

Further, the technical solutions of the present invention utilize acoustic signal ranging and PDR to judge the direction to locate a to-be-found item so as to find the to-be-found item, which are suitable for the existing intelligent terminals that can receive the acoustic signal within the frequency range, and can directly utilize the item locating and finding device and the intelligent terminal without the third-party device, so that the use is more convenient; and the fusion of the acoustic ranging and PDR location is not affected by the open environment and loud noise, and the location ranging is at a centimeter scale, so that the location accuracy is higher.

DETAILED DESCRIPTION OF THE EMBODIMENTS

Embodiment 1

Figure 1:
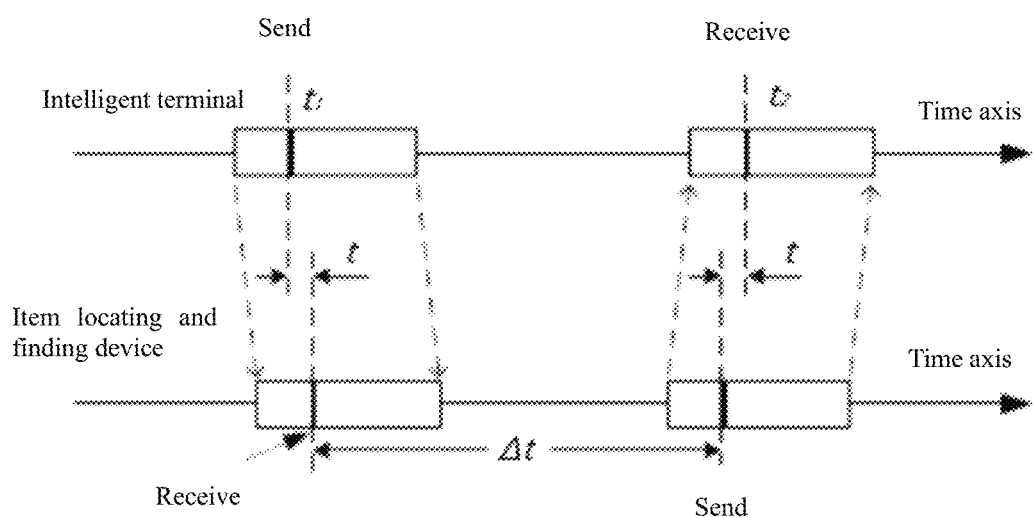
FIG. 1 is a schematic diagram showing unilateral and bidirectional ranging based on an acoustic signal of a location method of the present invention.
Figure 2:
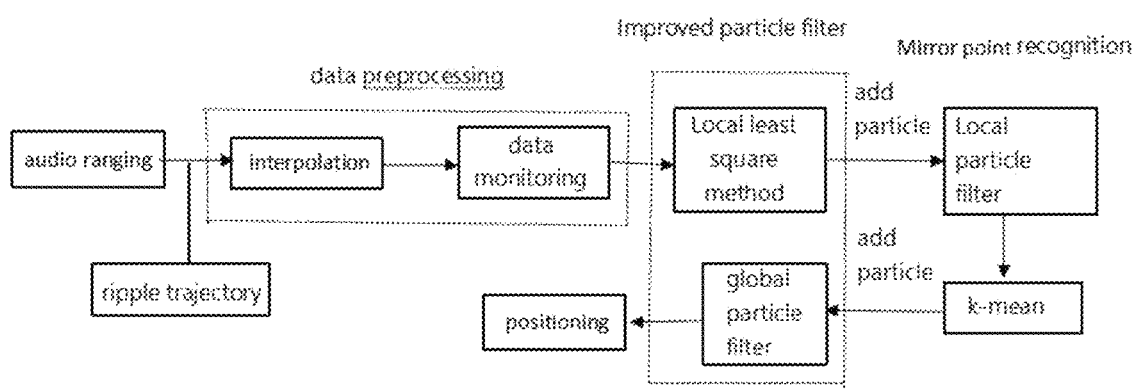
FIG. 2 is a schematic diagram of a principle of the location method of the present invention.

The present embodiment discloses an item locating and finding method based on an acoustic signal, which adopts a technical solution that includes the following steps:

Step 1, the Chirp signal is specially designed.

The specific acoustic signal is expressed as:

$$s(t) = A(t)e^{j2\pi\left(f_0 t + \frac{f_e - f_0}{2T} t^2\right)}, t \in [0, T]$$

Wherein A(t) is an amplitude of a sound wave, T is a period of a Chirp signal, $f_0$ and $f_e$ are an initial frequency and a cut-off frequency respectively. Because the acoustic signal in the room will appear fading, considering indoor fading channels, the received signal can be expressed as:

$$x(t) = s(t) * h(t) = \sum_{i=0}^{L-1} \alpha_i s(t - \tau_i) + N_i(t)$$

wherein, h(t) is the continuous expression of impulse response (CIR) of indoor acoustic channel; $\alpha_i$, $\tau_i$ and $N_i(t)$ are the channel fading coefficient, propagation delay, and random noise of the i-th propagation path, which, in general, should be the arrival time (ToA) of the first line of sight (LOS) component.

As for the signal working band, as long as the microphone can respond to the frequency band, both are available in this scenario.

Step 2, based on unilateral bidirectional ranging of acoustic signal;

Intelligent terminals broadcast Chirp signals, And record the current system time $t_1$, When the locating and the finding device installed on the item to be searched receives the Chirp signal broadcast by the intelligent terminal, it sends back a Chirp signal with a fixed delay $t_{reply}$ The intelligent terminal receives the Chirp signal and records the current system time $t_2$.

The flight time t of the signal between the intelligent terminal and the item locating and finding device is:

$$t=[(t_2-t_1)-t_{reply}]/2$$

After the flight time t is obtained, a distance l between the intelligent terminal and the item locating and finding device can be calculated easily:

$$L=v_{sound} \cdot t$$

Wherein $v_{sound}$ is a sound velocity, about 343 m/s.

Step 3, the accurate locating based on acoustic ranging and PDR also includes the following steps:

Step a, data is preprocessed.

Data preprocessing is performed on time-stamped data sequences.

First of all, due to the low transmission speed of the acoustic signal, after the time required to complete a two-way ranging in dynamic mode, the position of the intelligent terminal changes, so that the two time stamps recorded on the intelligent terminal are not in the same position. If the current moment of the ranging results are considered to be obtained in the current position, the error is larger, but the use of interpolation to the middle of the two positions, the error will be reduced by one, this is acceptable, so the latter, the use of interpolation to the middle of the two positions.

Secondly, for high precision in a short period of time, the results of PDR can be used as a constraint for ranging. The upper limit of the distance difference between two consecutive moments depends on the change in pedestrian position obtained by PDR. Since the distance gradient is the largest when the pedestrian handheld intelligent terminal moves forward towards the item locating and finding device, when the pedestrian handheld intelligent terminal is used in other directions, the threshold value in this direction is redundant. Therefore, a hypothesis test with a significance level ($\alpha$) of about 0.05 can be conducted to determine whether the ranging results are reliable.

Step b, Improved particle filter by local least square method.

A single observation is only one-dimensional data, which results in the weight of the particles being distributed by concentric circles of different radii, and is not sufficient to assess the position of the particles in the two-dimensional plane. Considering the short term high accuracy of the inertial range method, a constrained nonlinear least squares qualified local data is obtained using a time series-based window to estimate the reference position $(\hat{X}_{tag}, \hat{Y}_{tag})$ of the item locating and finding device.

$(\hat{X}_{tag}, \hat{Y}_{tag})$ acts as the center of a Gaussian distribution of random particles $$\{\hat{x}_i\}_{i=N}^{N+n}$$

initialized or added to the filter.

The filter starts to work after generating particles. Since the item locating and finding device is considered stationary, the position of the intelligent terminal changes in real time. The state model of the particle filter is expressed as:

$$\tilde{x}_i^t = \hat{x}_i^{t-1}$$

Since the ranging information (L) is the only observed value, the single observation model is expressed as:

$$\tilde{w}_i = (2\pi\sigma_L^2)^{-\frac{1}{2}} \exp\left\{-\frac{[L^t - h^t]^2}{2\sigma_L^2}\right\}$$

Wherein, h can be calculated as the distance between the i-th particle and the position of the intelligent terminal.

Finally, when the total number of particles exceeds the threshold$N_{threshold}$, refuse particles with low weights. Random resampling is adopted to alleviate the problem of sample poverty after multiple iterations. Current state estimates can be obtained from an approximate posterior probability distribution, is:

$$\hat{X}_{tag}^t = \sum_{i=1}^{N_{threshold}} \tilde{x}_i^t \tilde{w}_i^{t'}$$

Wherein, $$\tilde{w}_i^{t'}$$

is the standardization of $\tilde{w}_i^t$.

When the observed dimension is insufficient, the algorithm can improve the convergence efficiency compared with the general particle filter, and has the ability of self-correction by providing a relatively correct reference for the particle distribution that deviates from the real region due to occlusion. In addition, the present invention considers that the position near the present moment given by the PDR is more accurate. Therefore, this algorithm is suitable for PDR with high precision in a short time.

Step c, K-means method to identify mirror points

When the short time trajectory approximates a straight line, the estimated position obtained by the least square method has a certain probability of being the local optimal solution, which is determined by the initial value of the adjustment value. In addition, another local optimal solution relative to the trajectory at the mirror image may also be a global optimal solution. In order to detect the problem solution caused by the presence of the mirror point, the trajectory needs to be changed to increase a dimension, so that only a local optimal solution becomes a global optimal solution.

Therefore, the invention constructs another mirror particle filtering algorithm for estimating the position. Two locally optimal solutions $(X_1, Y_1)$, $(X_2, Y_2)$, uses local least square method to solve them, where one of them is the mirror point. In the initialization stage, N particles$\{\hat{x}_i^0\}_{i=1}^N$ and N particles $\{\hat{x}_i^0\}_{i=N+1}^{2N}$ are generated by a Gaussian distribution. they're centered around $(X_1, Y_1)$ and $(X_2, Y_2)$, The weight of each particle is set to ½N. This filter has the same status and observation updates as described in step b. After each particle update, the K-means algorithm with cluster number set to 2, and assigns all particles to their nearest cluster.

If the total weight of the particles in cluster $1 w_{total\_C1}$ is much less than the total weight of cluster $2 w_{total\_C2}$.

$$w_{total_{C1}} < \frac{1}{2} w_{total_{C2}}$$

Cluster 1 is considered to be the mirror point, and its particles are eliminated. Add the remaining particles from step b to the global particle filter.

Figure 4:
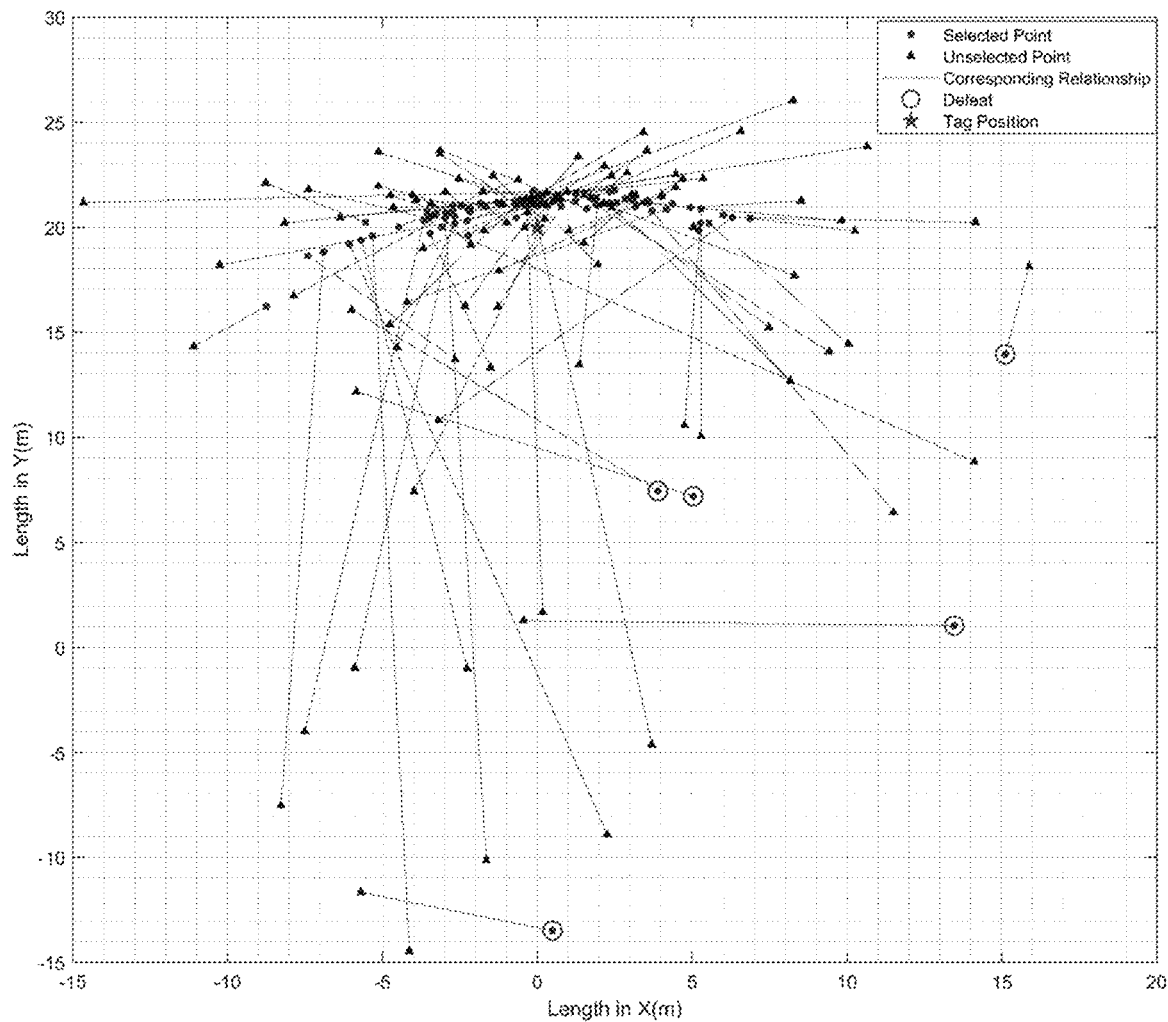
FIG. 4 is a schematic diagram of the distribution of mirror point recognition results of the present invention.

In this embodiment, an experiment is designed to evaluate the mirror point recognition method. Within 20 m from the item locating and finding device, the experimenter started 100 times at random in any direction. The positions of the two uncertainty points were mapped to real-world coordinates, and the location of the item locating and finding device in real-world coordinates was the place (0,20). As shown in FIG. 4, the red dots represent the identified results in each set of data, and the blue dots represent the filtered data. This shows that the method achieves 95% high precision.

Based on an acoustic signal, the locating system includes intelligent terminal and localization equipment provided in this embodiment.

The intelligent terminal includes an inertial sensor, a first loudspeaker and a first microphone, which is used for transmitting the acoustic signal, receiving the acoustic signal returned by the item locating and finding device and determining a movement track of the intelligent terminal. The intelligent terminal refers to mass user equipment with a communication function, and is not limited to the intelligent terminal equipment such as mobile phones, tablet computers, etc.; and in the present embodiment, intelligent terminal is preferred.

It may be understood that the intelligent terminal and the item locating and finding device shall have the same wireless communication function; and a communication module of the item locating and finding device is a BLE, so that the intelligent terminal shall also have the Bluetooth function. At present, mass user equipment on the market, such as intelligent terminal, tablet computers, etc., has the Bluetooth function, and contains the inertial sensor, the first speaker and the first microphone, so that the technology can be realized without changing any hardware of the mass user equipment.

The item locating and finding device is applied to a to-be-searched object, and includes a BLE unit, a second microphone, a processor and a second loudspeaker, which is used for receiving and processing the acoustic signal transmitted by the intelligent terminal and returning the signal.

Figure 3:
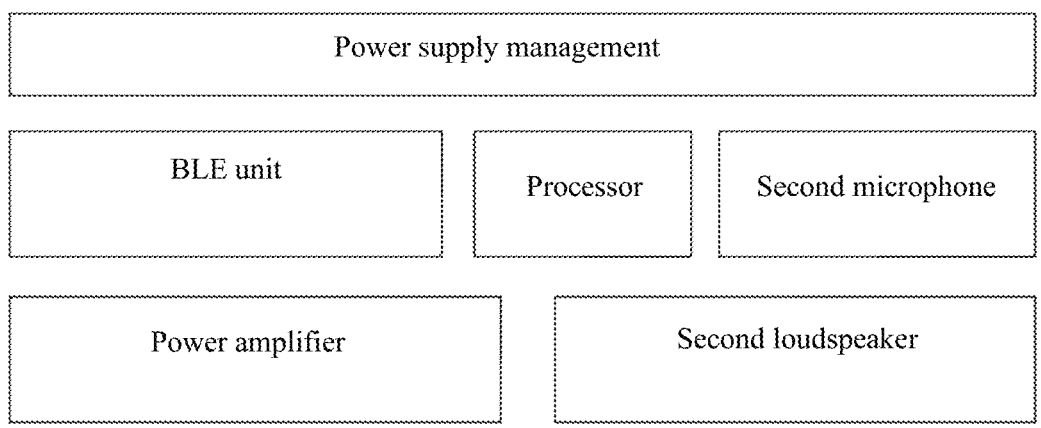
FIG. 3 is a schematic diagram of hardware of an item locating and finding device based on an acoustic signal of the present invention.

As shown in FIG. 3, an item locating and finding device based on acoustic signal provided by the embodiment of the present invention includes a power supply management module, a BLE unit, a processor, a microphone, a power amplifier and a loudspeaker. The power supply management module is used for supplying power to a circuit.

The BLE unit is used for communicating with the intelligent terminal so as to detect whether location finder equipment is within the coverage of a terminal signal.

The processor is used for processing the received acoustic signal, the electric quantity detection, the power supply control, etc.

The microphone is used for receiving the acoustic signal transmitted by the intelligent terminal.

The power amplifier is used for amplifying the processed signal.

The loudspeaker is used for transmitting the amplified acoustic signal.

In order to evaluate the overall performance of the system, a variety of tests were carried out, including systematic ranging experiment, typical indoor environment object search test and comparison test, object search test in different directions, and wide area indoor object search test.

Test A, Systematic Ranging Experiment

Static ranging and dynamic ranging experiments were carried out in the indoor environment.

Static Ranging Experiments

The item locating and finding device is fixed at the end of a long corridor with a height of 1.5 m. The smartphone is kept at the same height as the item locating and finding device. The reference distance is from 1 m to 40 m and the step length is 1 m. The ranging frequency and test time at each point were set to 2 Hz and 10 s respectively. The collected ranging results were compared with each ground true value measured by the SNDWAY laser rangefinder SW-80G to calculate ranging errors.

Figure 5:
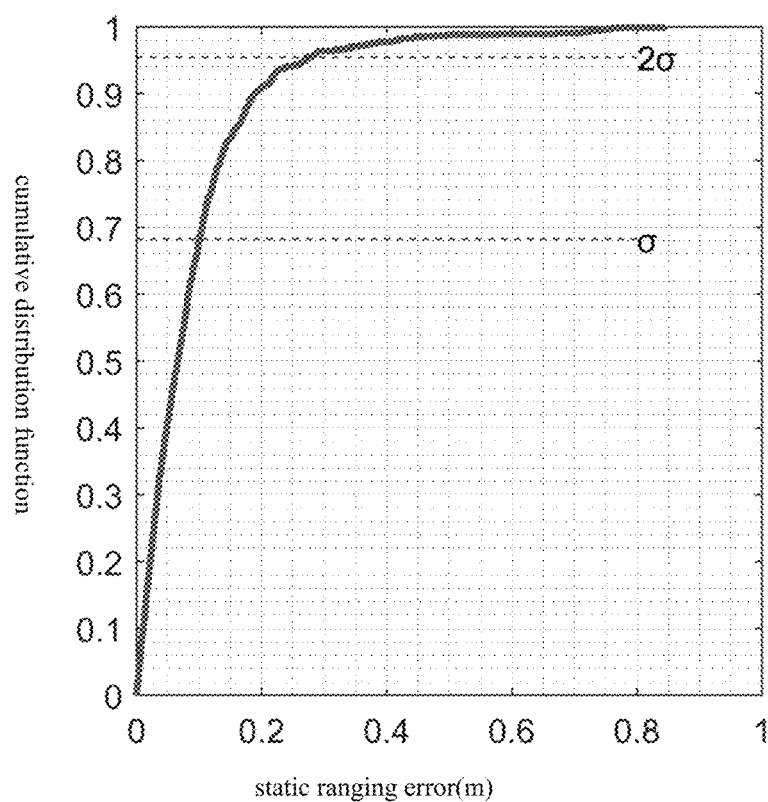
FIG. 5 is the cumulative distribution and error range of static ranging error of test A of the present invention.
Figure 6:
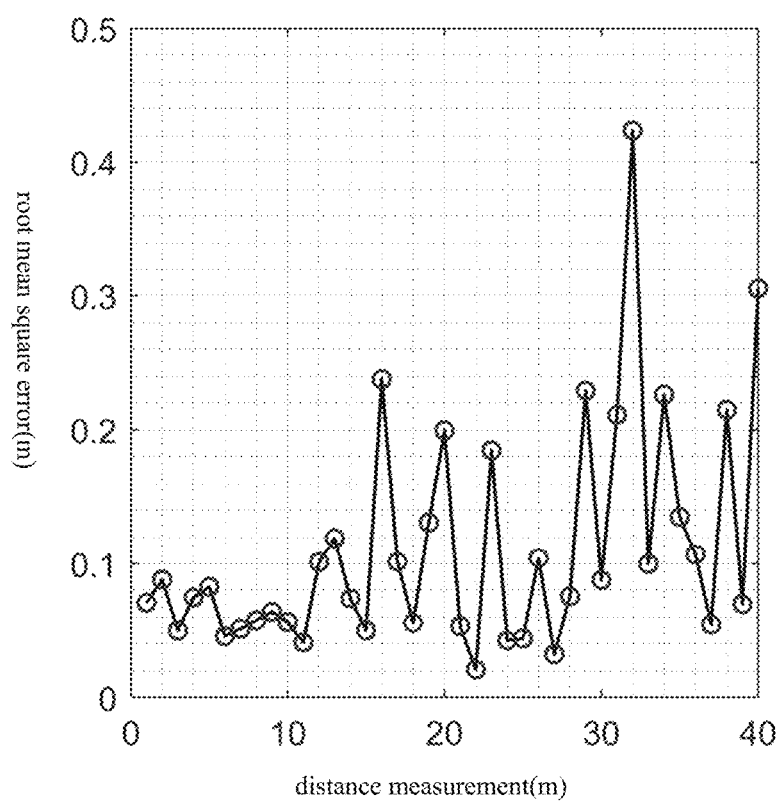
FIG. 6 is the relationship between the root mean square error and the range of static distance measurement in test A of the present invention.

The cumulative distribution function (CDF) of static ranging errors is shown in FIG. 5. The average ranging accuracy of 0.100 m and 0.276 m is achieved in the audio locating object hunt system at 26 places. The root mean square error (RMSE) of static ranging is shown in FIG. 6. The estimated RMSE is less than 40 cm between 30 m and 40 m, less than 25 cm between 15 m and 30 m, and less than 12 cm between 0 and 15 m.

Dynamic Ranging Experiments

In the initial phase, the item locating and finding device was placed at a height of 1.0 m, which is close to the height of the smartphone held by the experimenter. The subjects held a smartphone and a 360° prism tracked by a Leica Nova TS60, then move in a straight line from 40 m to 1 m at a constant speed (about 0.6-1 m/s) towards the item locating and finding device, and repeat for 5 times. Each truth value in real time is obtained by the known distance between the location of the item locating and finding device and the tracking result.

Figure 7:
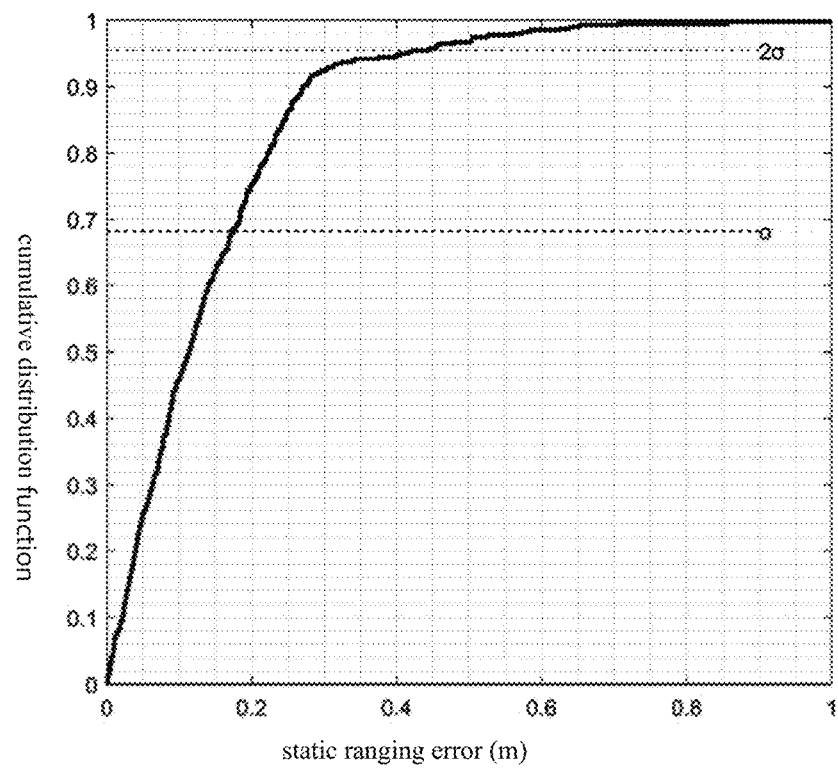
FIG. 7 is the relationship between cumulative distribution of dynamic ranging error and dynamic error range of test A of the present invention.

The cumulative distribution function (CDF) of dynamic ranging errors is shown in FIG. 7. The acoustic item locating and finding system achieves the average ranging accuracy of 0.174 m and 0.435 m at 26 place.

Test B, Search Test and Comparison Test in the Typical Indoor Environment.

The interior environment usually consists of rooms and passages. System performance was evaluated in a cluttered 8.8 m×15.7 m office, where workstation partitions and clutter were about 1.2 m high and cubicle desks were 0.75 m high. The item locating and finding devices were successively placed at different locations on one side of the room (about 0.8 m apart), and the subjects held smart phones to find the item locating and finding device at a height of 1.0-1.1 m.

Figure 8A:
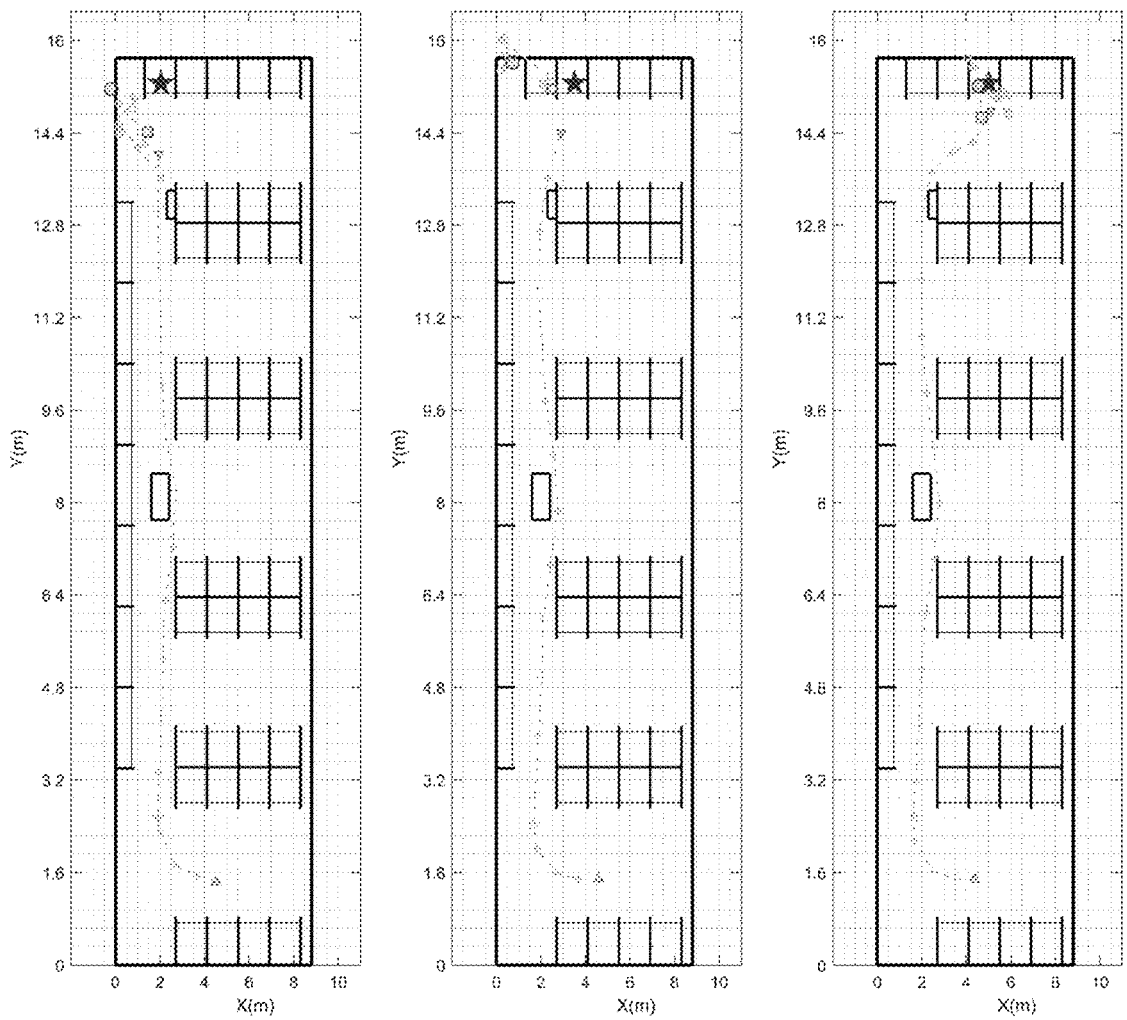
FIG. 8A and FIG. 8B are schematic diagrams of the positioning results of a typical office in test B of the present invention.
Figure 8B:
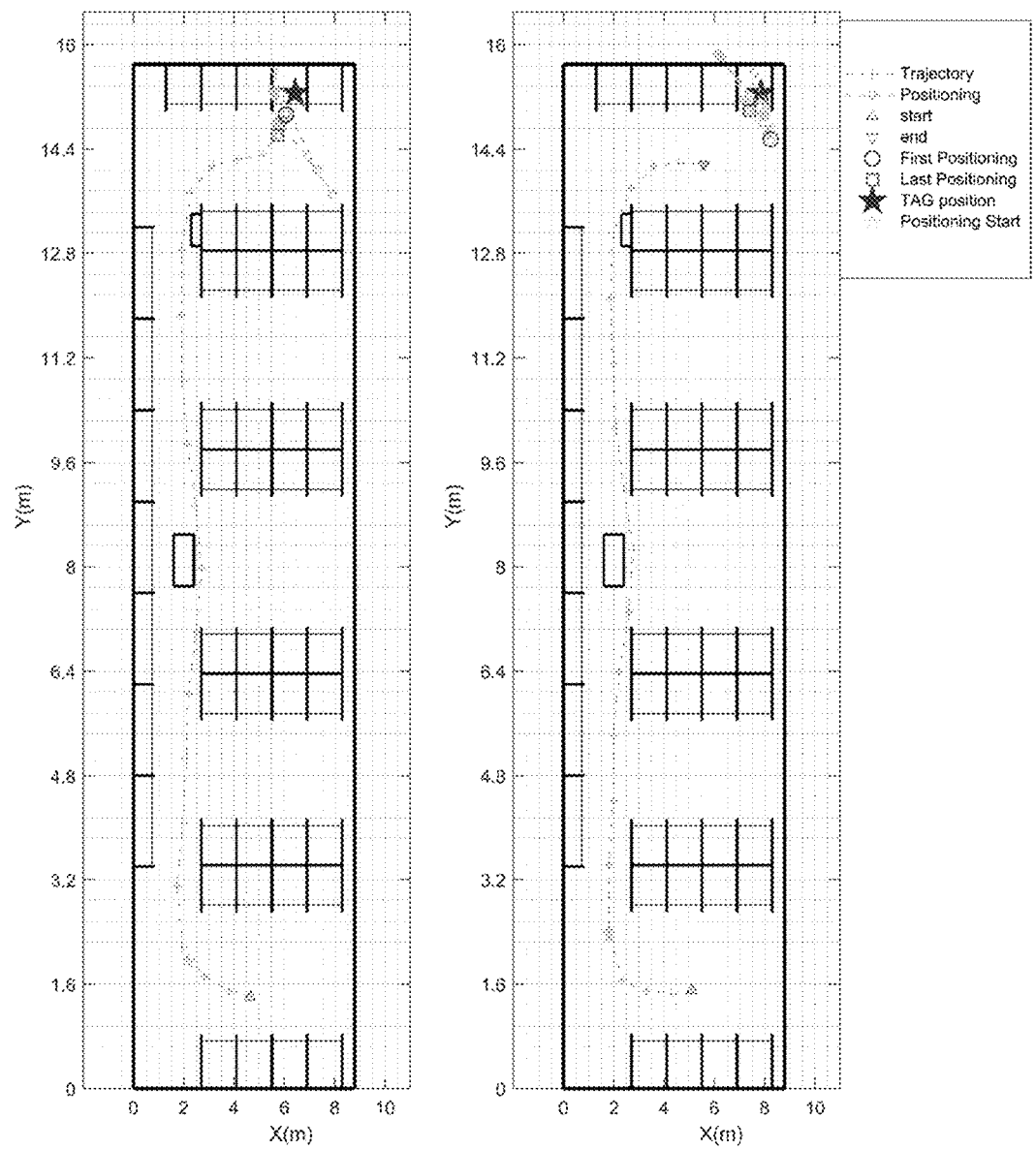
Figure 9:
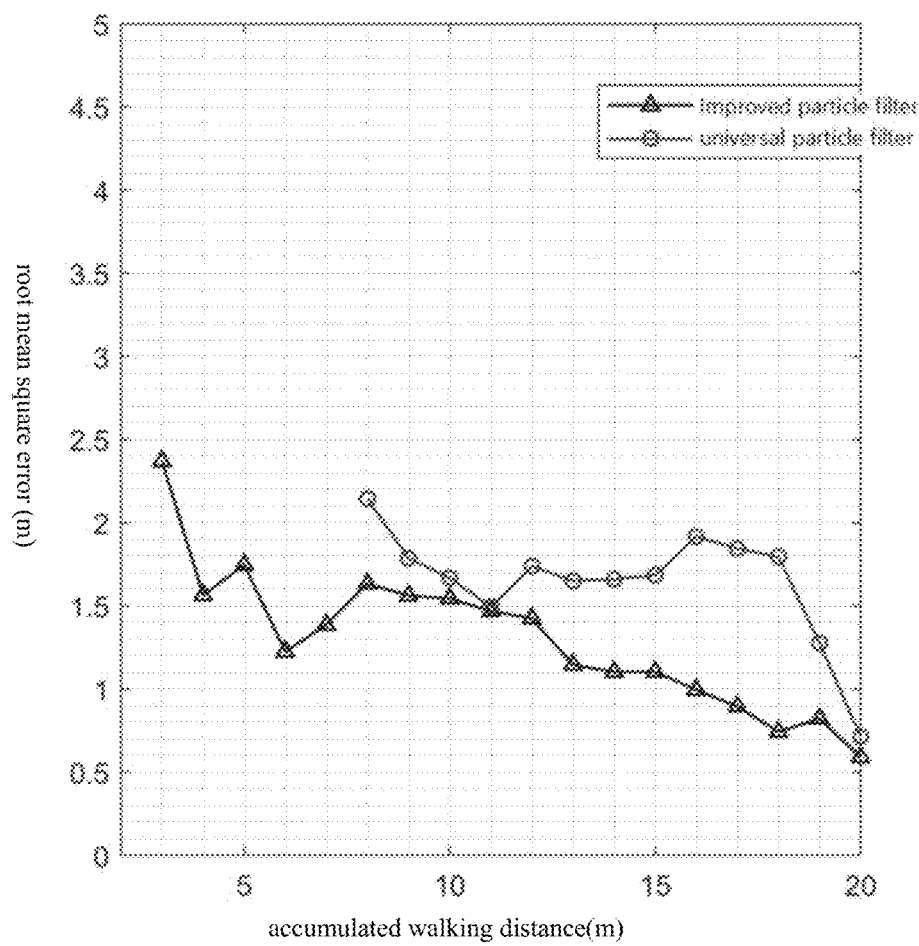
FIG. 9 is the root-mean-square error relationship between walking distance and distance measurement in test B of the present invention.
Figure 10:
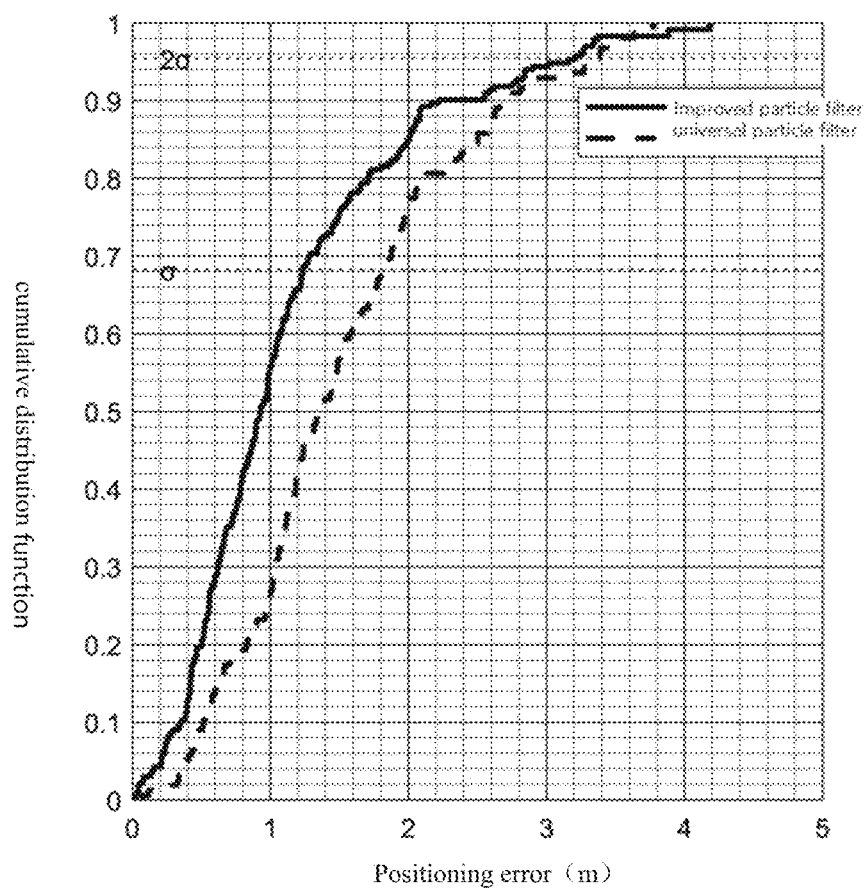
FIG. 10 is the relationship between cumulative distribution of ranging error and positioning error of test B of the present invention.

By allocating the experimenter's current position and heading estimated by the PDR algorithm with the corresponding real position and the real position and heading tracked by TS60, the coordinate system of the item locating and finding device is mapped to the real coordinate system. FIG. 8A and FIG. 8B show the real-time location results of the item locating and finding device at different locations in the office. FIG. 9 and FIG. 10 show the positioning accuracy, robustness and convergence of the algorithm. The improved particle filter was able to achieve the initial positioning within the RMSE of 2.5 m when the experimenter walked 3 m on average. In the subsequent positioning, the RMSE was less than 1.6 m, and the average positioning accuracy was 0.100 m and 0.276 m at 26 place, which was better than the general particle filter.

Figure 11:
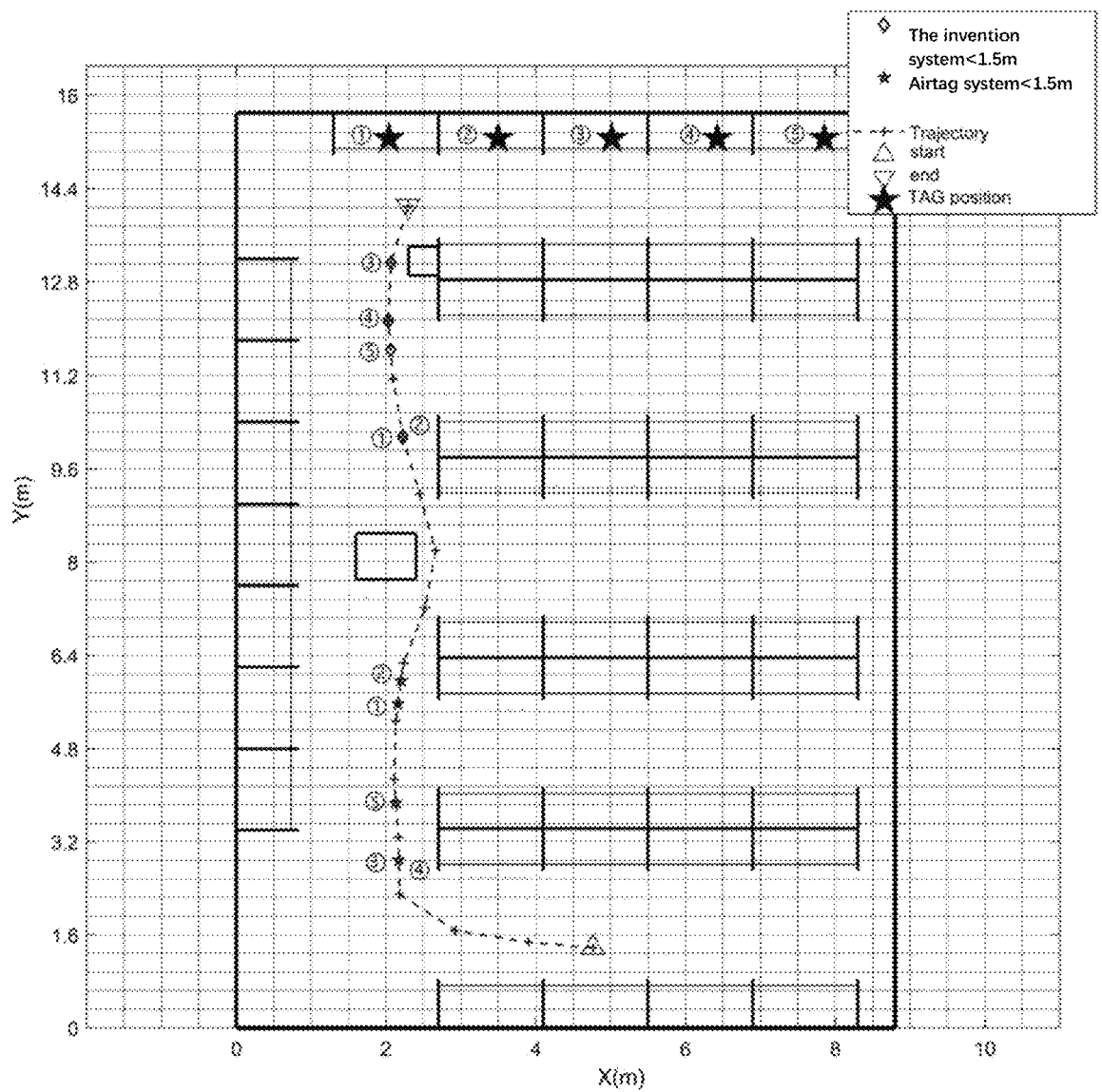
FIG. 11 is a comparison diagram of positioning efficiency between the present invention and the Air tag system.

In addition, the system was compared with the Airtag system to evaluate its positioning efficiency. The experimenter searches the item locating and finding device or Airtag of the invention at different locations along a reference track and records the minimum accumulated distance on foot with an accuracy of 1.5 m. The positioning efficiency of these two systems is shown in FIG. 11. Detailed statistics are shown in Table 1.

TABLE 1

Statistical data of minimum cumulative distance walking comparison

|  | position 1 | position 2 | position 3 | position 4 | position 5 |
| --- | --- | --- | --- | --- | --- |
| this system | 6.3 m | 6.7 m | 3.6 m | 3.6 m | 4.6 m |
| Airtag | 12.0 m | 12.0 m | 15 m | 14 m | 13.5 m |

The statistical results show that the positioning efficiency of this system is higher than that of Airtag system, and the accumulated walking distance is about one-half to one-fourth of that of Airtag system.

Test C, Search Tests in Different Directions

Figure 12A:
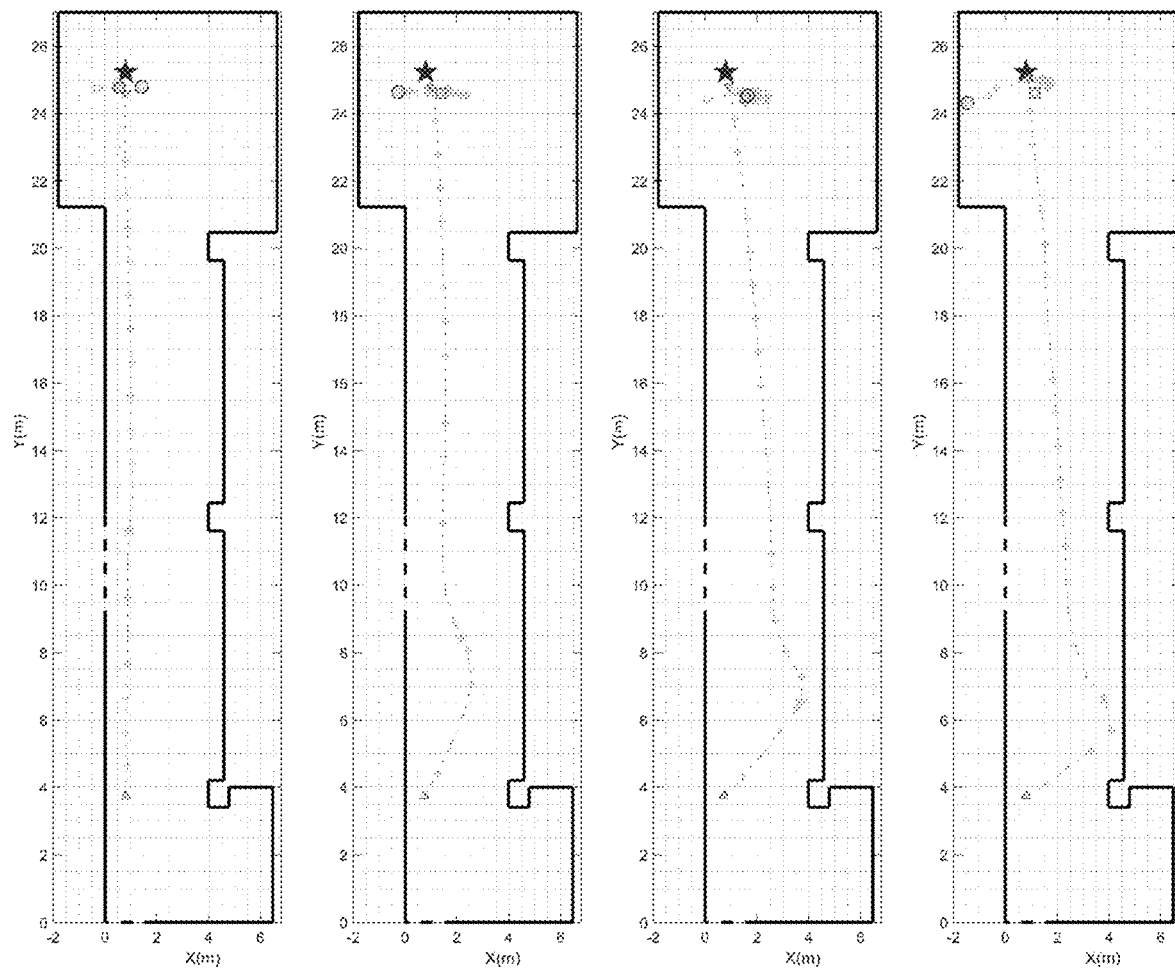
FIG. 12A and FIG. 12B are the trajectories and real-time positioning results of test C of the present invention in the corridor in 6 different initial directions.
Figure 12B:
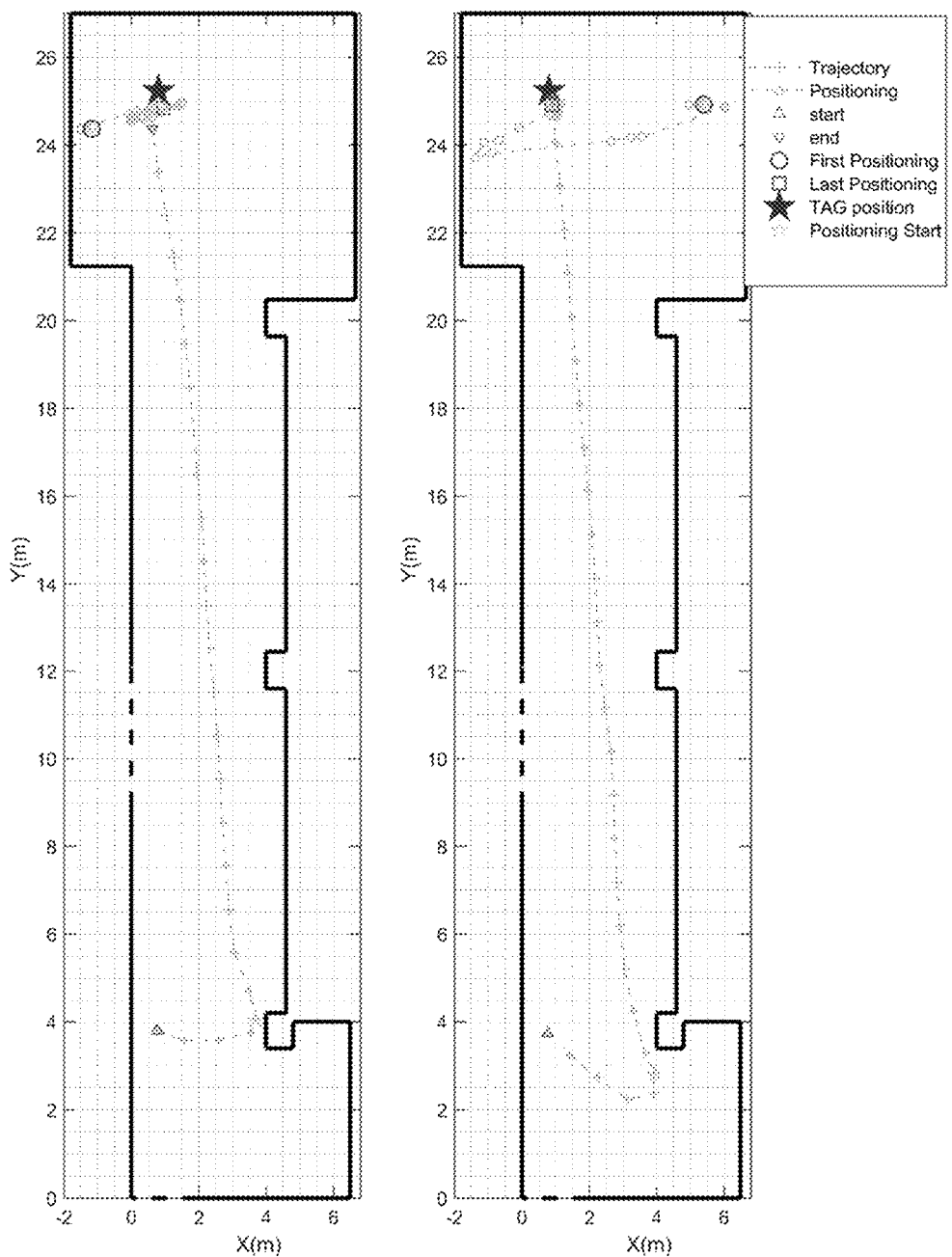
Figure 13:
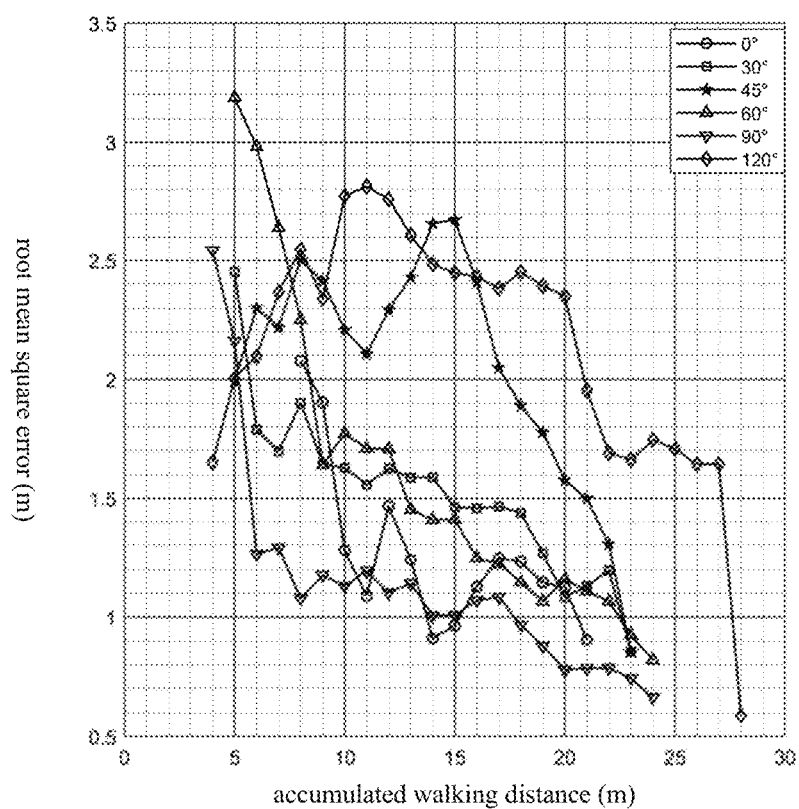
FIG. 13 is the relationship between the root mean square error of distance C and walking distance of the present invention.
Figure 14:
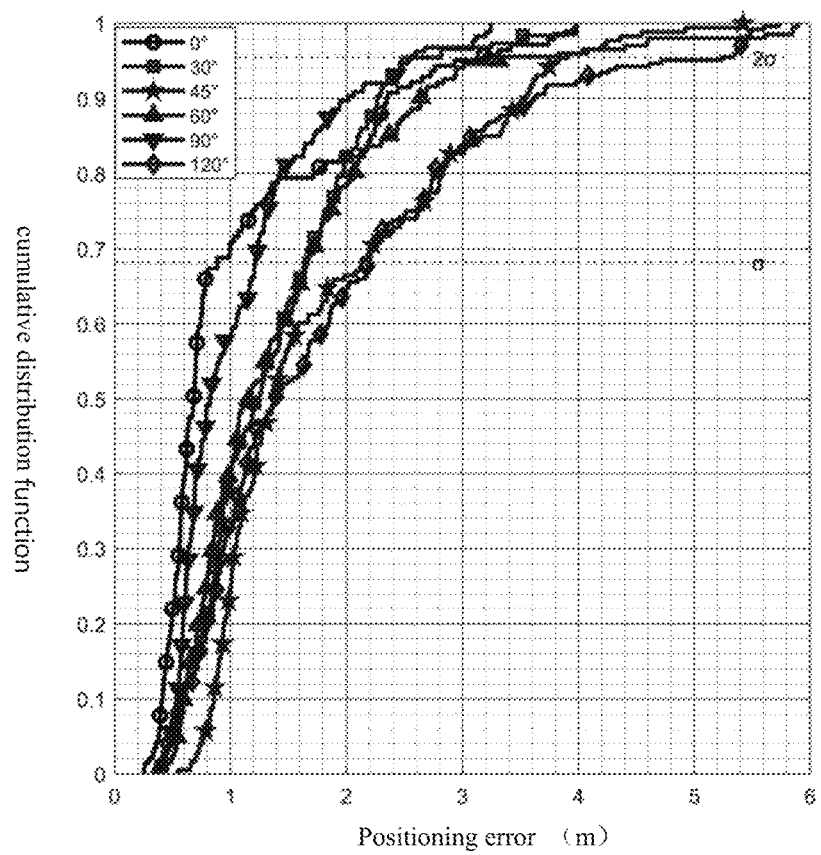
FIG. 14 is the relationship between cumulative distribution of ranging error and positioning error of test C of the present invention.

The experiment was conducted in a relatively empty indoor environment, where the subjects were more free to move around in search of item locating and finding devices. Evaluate the performance of locating and locating equipment by moving forward from different initial directions. The experimental scene is a 4 m×28 m corridor, and the item locating and finding device is located at the end of the corridor. Starting at a fixed point at the other end of the corridor, the experimenter moved 10 times in each direction (0°, 30°, 45°, 60°, 90°, 120°) in different directions relative to the item locating and finding device. The same method as in experiment B was used to estimate the location of item locating and finding devices in the real world to evaluate positioning errors. FIG. 12 shows the trajectory and real-time positioning results of six different initial directions in the corridor. FIG. 13 and FIG. 14 show the cumulative distribution function and root mean square values of the errors.

TABLE 2

| statistical data for comparison of directions | | | | | | |
| --- | --- | --- | --- | --- | --- | --- |
|  | 0°/m | 30°/m | 45°/m | 60°/m | 90°/m | 120°/m |
| σ | 0.9 | 1.7 | 2.1 | 1.6 | 1.2 | 2.2 |
| 2σ | 3.2 | 2.6 | 3.9 | 3.4 | 2.6 | 5.2 |

FIG. 12A and FIG. 12B, FIG. 13, FIG. 14 and Table 2 show that: the highest accuracy is achieved at 1 m on average, when the initial directions are 0° and 90° respectively, and the latter requires a shorter cumulative walking distance. However, the accuracy is lowest when the initial orientation is 45° (between 0° and 90°), which is due to the user's lack of significant variation characteristics with respect to the geometric position of the item locating and finding device. Due to the high ranging error caused by body occlusion, its accuracy decreases at the initial orientation of 120°, which is adjacent to the return item locating and finding device. When the initial direction exceeds 135°, body occlusion results in higher ranging errors and even undetectable acoustic signals. Therefore, in this case, the system does not start positioning, but instead advises the user to change the direction of movement first.

Test D, Wide Area Indoor Object Search Test

Figure 15A:
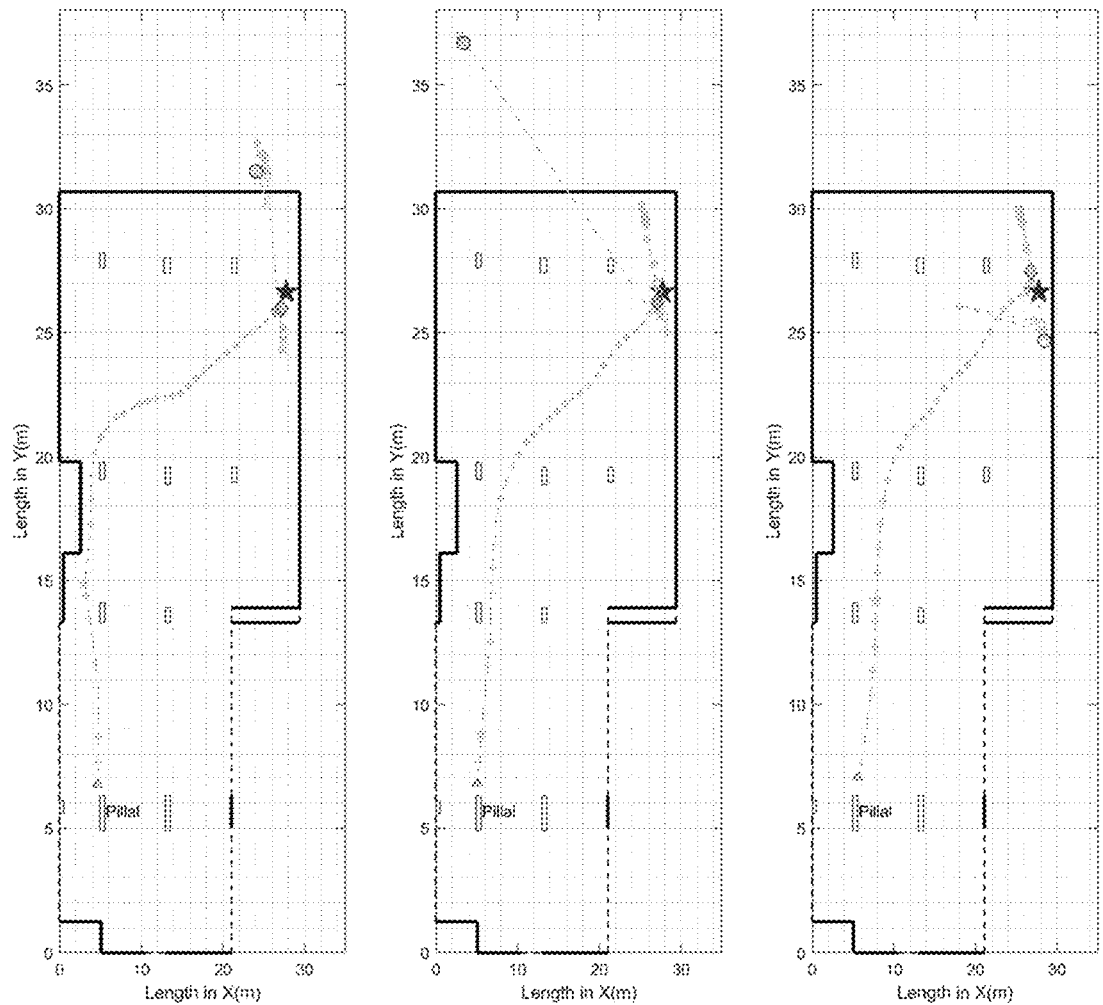
FIG. 15A and FIG. 15B are the real trajectories of experimenter in test D of the present invention and the positioning change diagram of real-time positioning object finding equipment in parking lot.
Figure 15B:
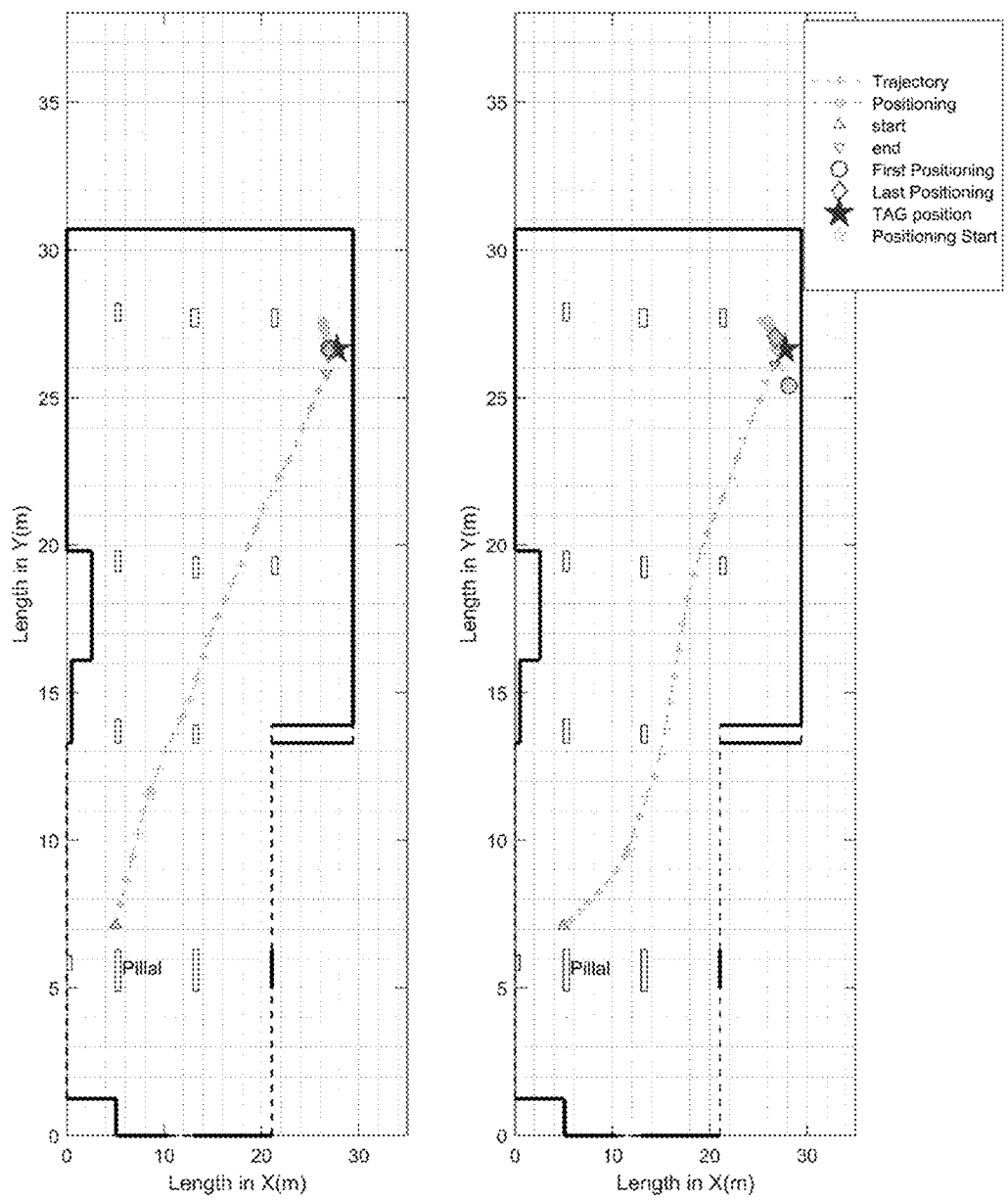
Figure 16:
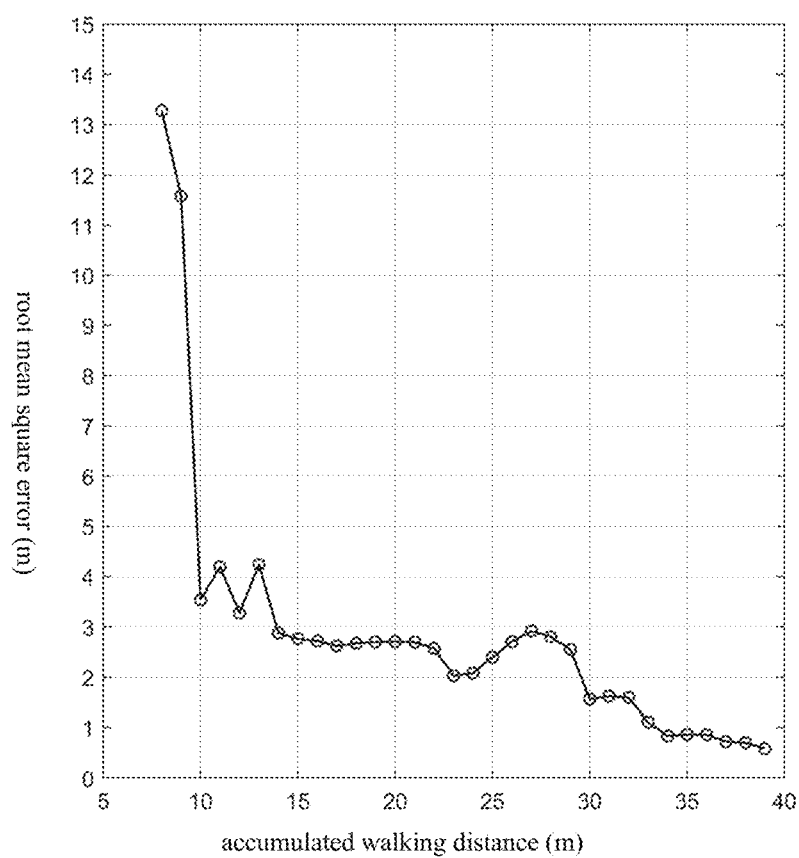
FIG. 16 is the relationship between the root mean square error of distance measurement and walking distance of test D of the present invention.
Figure 17:
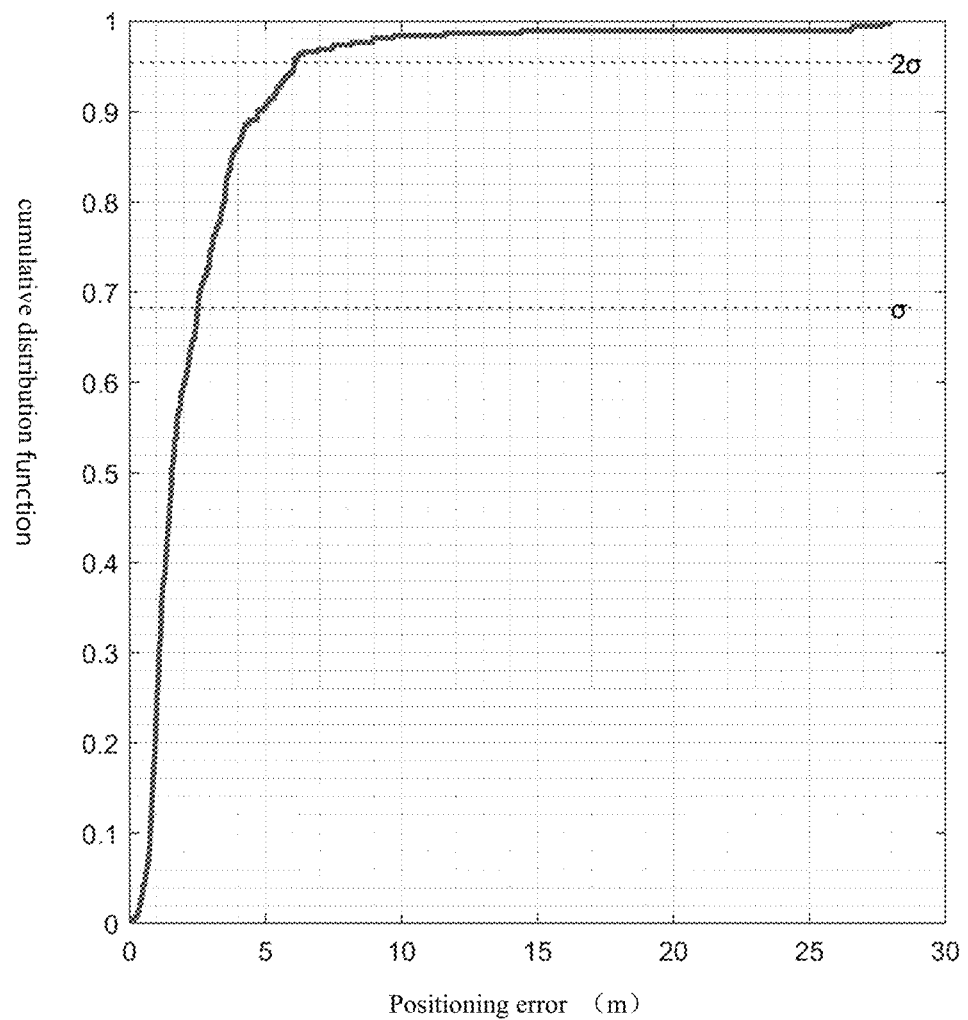
FIG. 17 is the relationship between cumulative distribution of ranging error and positioning error of test D of the present invention.

In order to evaluate the asset management capability of the system on a wide area, an experiment was designed to simulate a car search in an underground parking lot. The experimental site is located in the underground parking lot of an experimental building of a university in Wuhan, which contains multiple columns and a large number of parking Spaces. The location finder was placed in a corner of the parking lot at a height of about 1.6 meters (close to the height of the car). The experimenters started the experiment holding a smartphone along five different trajectories on the diagonal, passing columns and parked cars. FIG. 15 shows the real trajectories of the experimenter and the changes in the location of the real-time location finder equipment in the parking lot. The average cumulative walking distance required to achieve initial positioning is 10 m, and the average error is 2.5 m at a place and 6 m at 2σ place, as shown in FIG. 16 and FIG. 17.

The circuit connection involved in the present invention is a common means adopted by those skilled in the prior art, and technical enlightenment can be obtained through limited tests, which belongs to common sense.

Components that are not described in detail herein belong to the prior art.

The specific embodiment of the present invention is described in detail above, but the present invention is not limited to the above embodiment, and various changes can be made without departing from the tenet of the present invention within the scope of the knowledge of those skilled in the prior art; and the changes or transformation without creative labor is still within the protection scope of the present invention.

The invention claimed is:

1. An item locating and finding method based on an acoustic signal, comprising following steps:

step 1, designing a specific acoustic signal that is expressed as:

$$s(t) = A(t)e^{j2\pi\left(f_0 t + \frac{f_e - f_0}{2T}t^2\right)}, t \in [0, T]$$

wherein A(t) is an amplitude of a sound wave, T is a period of a Chirp signal, and $f_0$ and $f_e$ are an initial frequency and a cut-off frequency respectively;

a received signal is:

$$x(t) = s(t) * h(t) = \sum_{i=0}^{L-1} \alpha_i s(t - \tau_i) + N_i(t)$$

wherein h(t) is a continuous expression of impulse response (CIR) of an indoor acoustic channel $\alpha_i$, $\tau_i$ and $N_i(t)$ are a channel fading coefficient, a propagation delay and a random noise of an i-th propagation path;

step 2, performing unilateral and bidirectional ranging based on the acoustic signal;

wherein an intelligent terminal broadcasts an acoustic Chirp signal using a first loudspeaker of the intelligent terminal, and records a current system time $t_1$, after receiving the acoustic Chirp signal by an item locating and finding device installed on a to-be-searched object using a second microphone of the item locating and finding device, the item locating and finding device returns, using a second loudspeaker of the item locating and finding device a Chirp signal after delaying a fixed period of time $t_{reply}$; the intelligent terminal receives a returned Chirp signal using a first microphone of the intelligent terminal; and the intelligent terminal records a current system time $t_2$; an inertial sensor of the intelligent terminal is used for determining a movement track of the intelligent terminal;

a flight time (t) of a signal between the intelligent terminal and the item locating and finding device is:

$$t=[(t_2-t_1)-t_{reply}]/2$$

a distance (L) between the intelligent terminal and the item locating and finding device is calculated based on the flight time (t):

$$L=v_{sound} \cdot t$$

wherein the $v_{sound}$ is a sound velocity;

step 3, locating based on acoustic ranging and pedestrian dead reckoning (PDR) comprises following steps:

step a, data is preprocessed;

wherein a time required to complete a two-way ranging in dynamic mode, a position of the intelligent terminal changes, two time stamps recorded on the intelligent terminal are not in a same position, interpolation is used to a middle of two positions when the two time stamps recorded on the intelligent terminal are not in the same position;

a hypothesis test with significance level a of about 0.05 is conducted to determine whether ranging results are reliable;

step b, local least square method improves a particle filter wherein a time series-based window is used to obtain qualified local data of a constrained nonlinear least square method to estimate a reference position of the item locating and finding device, wherein the reference position ($\hat{X}_{tag}$, $\hat{Y}_{tag}$) acts as a center of a Gaussian distribution of random n particles $$\{\hat{x}_i\}_{i=N}^{N+n}$$

initialized or added to a filter; the filter starts to work after generating particles; wherein the item locating and finding device is considered to be stationary, the position of the intelligent terminal changes in real time; a state model of the particle filter is expressed as:

$$\tilde{x}_i^t = \hat{x}_i^{t-1}$$

a ranging information L is an observed value, a single observation model is expressed as:

$$\tilde{w}_i = (2\pi\sigma_L^2)^{-\frac{1}{2}} \exp\left\{-\frac{[L^t - h^t]^2}{2\sigma_L^2}\right\};$$

wherein, h is calculated as a distance between an i-th particle and the position of the intelligent terminal;

when a total number of particles exceeds a threshold $N_{threshold}$ refuse particles with low weights are rejected; state estimates are obtained from an approximate posterior probability distribution, is:

$$\hat{X}_{tag}^t = \sum_{i=1}^{N_{threshold}} \tilde{x}_i^t \tilde{w}_i'$$

wherein $\tilde{w}_i^{t'}$ is a standardization of $\tilde{w}_i^t$;

step c, a K-means method to identify mirror points when a short time trajectory approximates a straight line, both an estimated position and a mirror point obtained by a least square method may be a global optimal solution, therefore, another mirror particle filtering algorithm is constructed for estimating a position, including two locally optimal solutions ($X_1$, $Y_1$) within mirror points, ($X_2$, $Y_2$) is solved by the local least square method; where one of the two locally optimal solutions ($X_1$, $Y_1$) is the mirror point; in the initialization stage, N particles $$\{\hat{x}_i^0\}_{i=1}^N$$

and N particles $$\{\hat{x}_i^0\}_{i=N+1}^{2N}$$

are generated by a Gaussian distribution; the N particles are centered around ($X_1$, $Y_1$) and ($X_2$, $Y_2$), a weight of each particle is set to ½N; the filter has a same status and observation updates as described in Step b; after each particle update, a K-means algorithm with cluster number set to 2, assigns all particles to their nearest cluster;

if a total weight of particles in cluster $1 w_{total\_C1}$ is much less than the total weight of cluster $2 w_{total\_C2}$;

$$w_{total_{C1}} < \frac{1}{2} w_{total_{C2}}$$

cluster 1 is considered to be the mirror point, and particles corresponds to the mirror point are eliminated; add remaining particles from step b to a global particle filter.

\* \* \* \* \*